No. 686,656. Patented Nov. 12, 1901.
A. J. HOBAN.
MACHINE FOR MAKING TILES.
(Application filed Feb. 8, 1899.)
(No Model.) 7 Sheets—Sheet 1.

Witnesses

Inventor
Andrew J. Hoban
By Merwin Lothrop & Johnson
his Attorneys

No. 686,656. Patented Nov. 12, 1901.
A. J. HOBAN.
MACHINE FOR MAKING TILES.
(Application filed Feb. 8, 1899.)
(No Model.) 7 Sheets—Sheet 2.

Witnesses
T. S. White
E. H. Shibley

Inventor
Andrew J. Hoban
By Merwin Rothrop & Johnson
his Attorneys

No. 686,656. Patented Nov. 12, 1901.
A. J. HOBAN.
MACHINE FOR MAKING TILES.
(Application filed Feb. 8, 1899.)
(No Model.) 7 Sheets—Sheet 3.
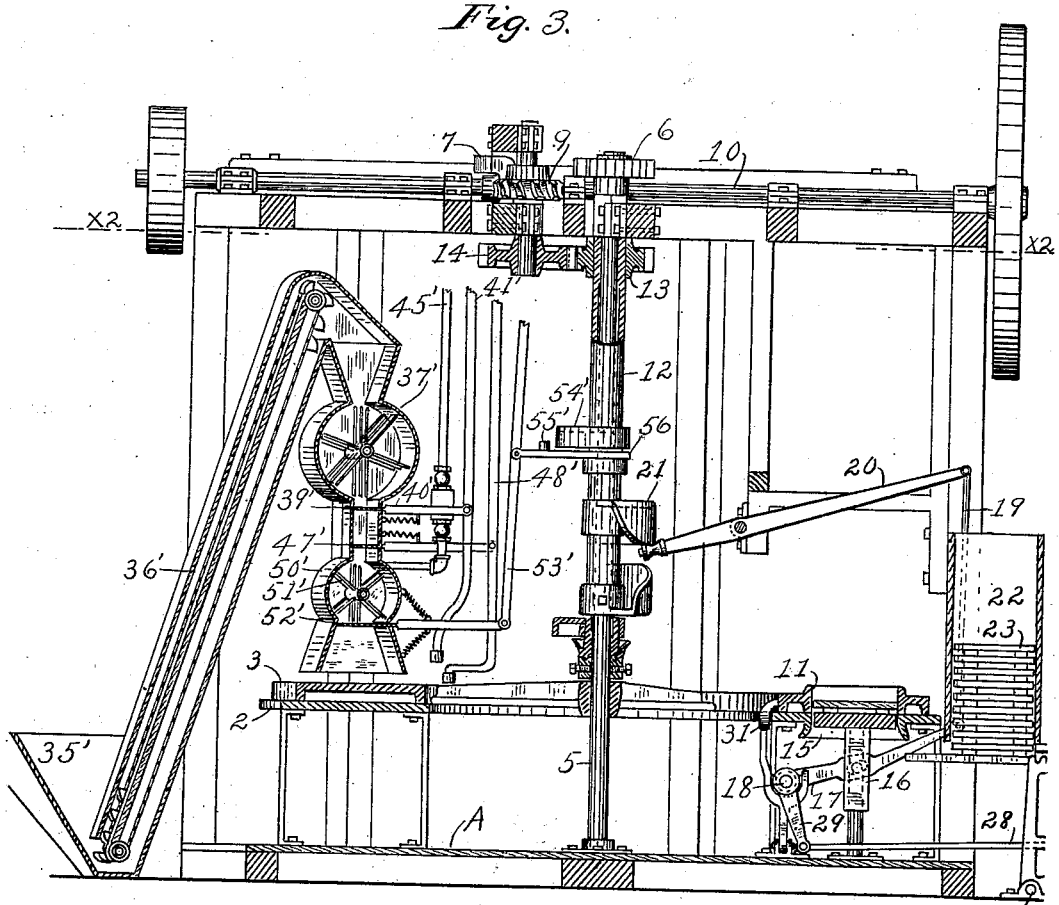
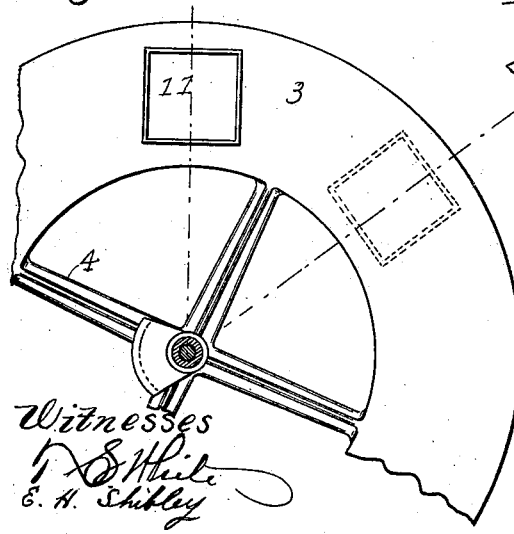
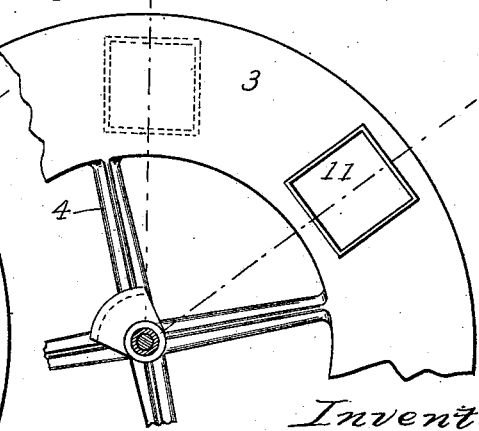
Witnesses
Inventor
Andrew J. Hoban
By Mervin Lothrop & Johnson
his Attorneys No. 686,656. Patented Nov. 12, 1901.
A. J. HOBAN.
MACHINE FOR MAKING TILES.
(Application filed Feb. 8, 1899.)
(No Model.) 7 Sheets—Sheet 4.

Witnesses
T. S. White
E. H. Shibley

Inventor
Andrew J. Hoban
By Merwin Lothrop & Johnson
his Attorneys

THE NORRIS PETERS CO., PHOTO-LITHO., WASHINGTON, D. C.

No. 686,656. Patented Nov. 12, 1901.
A. J. HOBAN.
MACHINE FOR MAKING TILES.
(Application filed Feb. 8, 1899.)
(No Model.) 7 Sheets—Sheet 5.
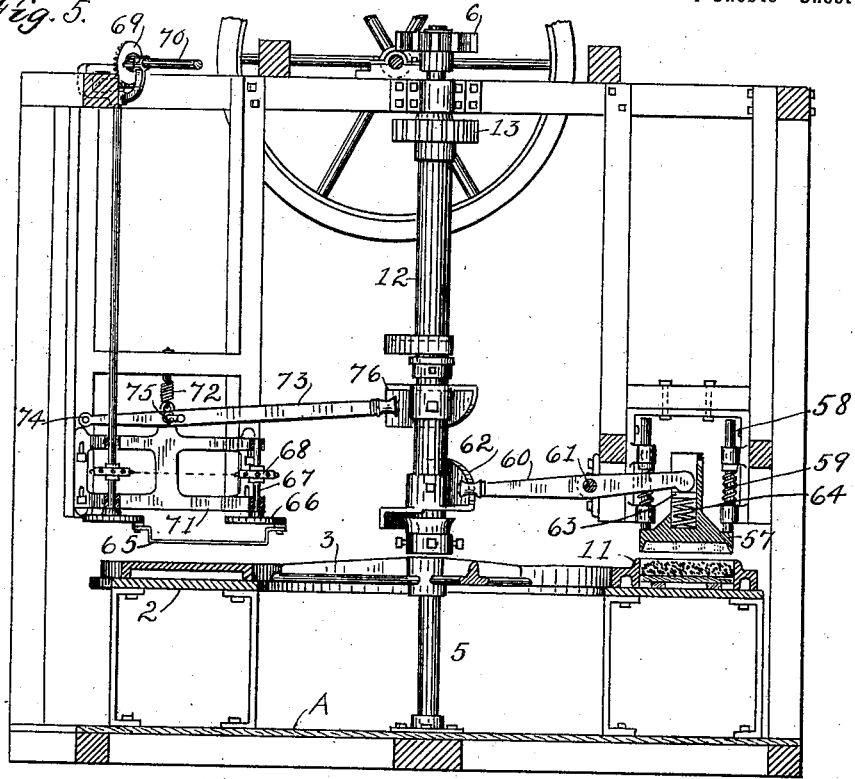
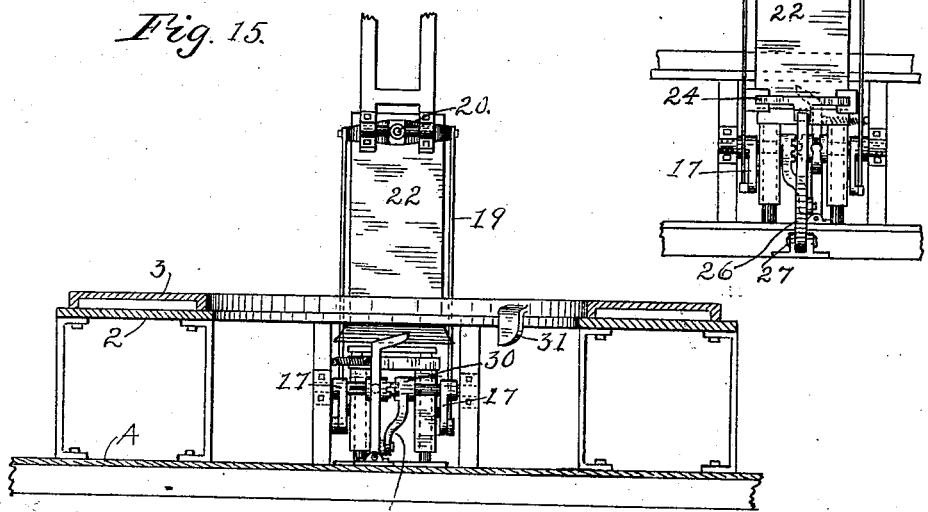
Witnesses
T. S. White
E. H. Shibley
Inventor
Andrew J. Hoban
By Merwin Rothrop & Johnson
his Attorneys No. 686,656.  
A. J. HOBAN.  
MACHINE FOR MAKING TILES.  
(Application filed Feb. 8, 1899.)  
Patented Nov. 12, 1901.

(No Model.)  
7 Sheets—Sheet 6.

Witnesses  
Inventor  
Andrew J. Hoban  
By Merwin Lothrop & Johnson  
his Attorneys No. 686,656. Patented Nov. 12, 1901.
A. J. HOBAN.
MACHINE FOR MAKING TILES.
(Application filed Feb. 8, 1899.)
(No Model.) 7 Sheets—Sheet 7.
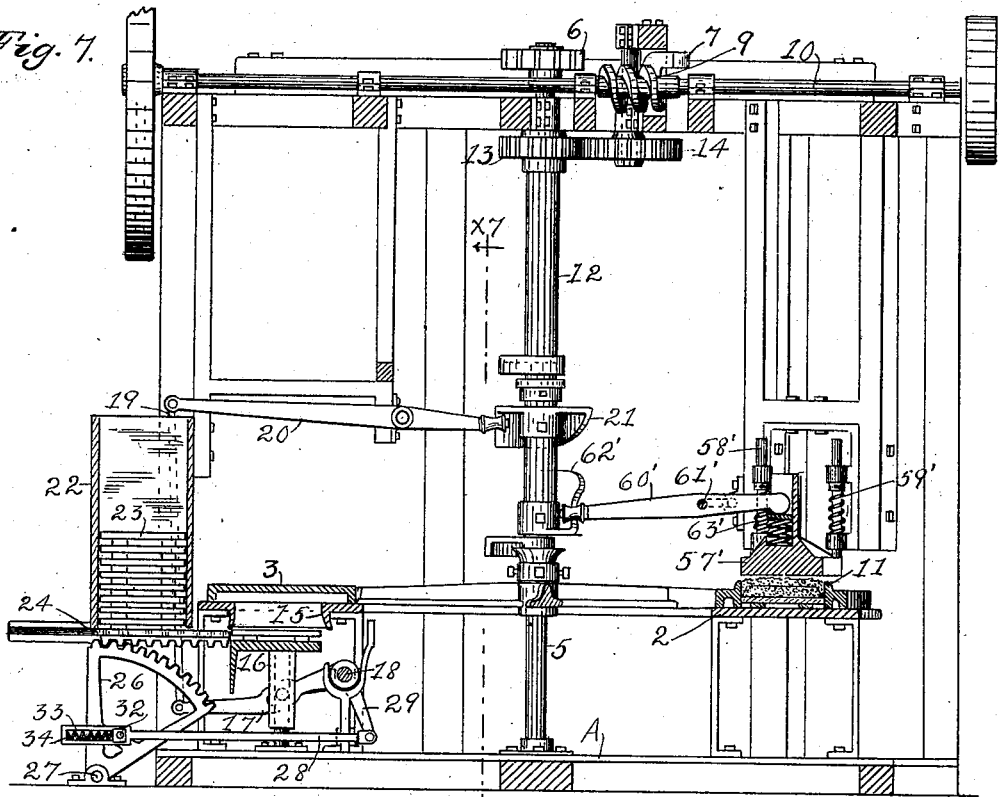
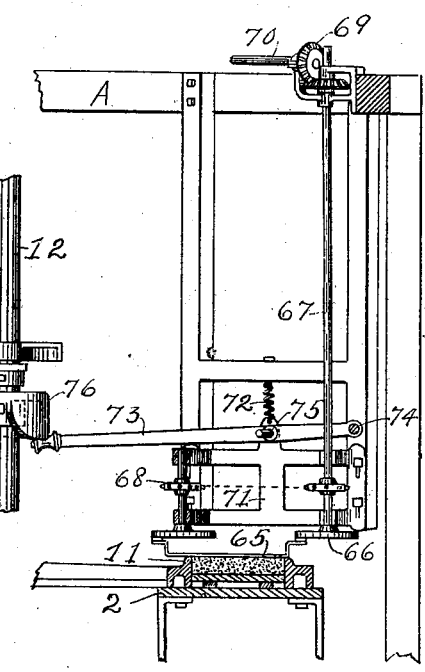
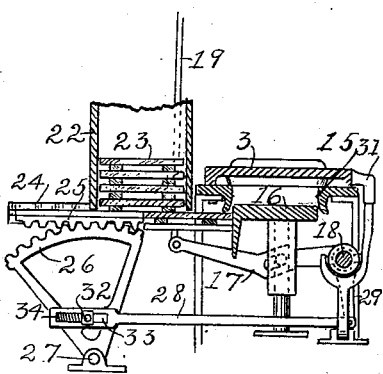
Witnesses
Inventor
Andrew J. Hoban
By Merwin Lothrop & Johnson
his Attorneys

UNITED STATES PATENT OFFICE.

ANDREW J. HOBAN, OF ST. PAUL, MINNESOTA, ASSIGNOR OF ONE-HALF TO JOHN P. BERCHEM, OF ST. PAUL, MINNESOTA.

MACHINE FOR MAKING TILES.

SPECIFICATION forming part of Letters Patent No. 686,656, dated November 12, 1901.

Application filed February 8, 1899. Serial No. 704,883. (No model.)

*To all whom it may concern:*

Be it known that I, ANDREW J. HOBAN, of St. Paul, Ramsey county, Minnesota, have invented certain Improvements in Machines for Making Tiles, of which the following is a specification.

My invention relates to improvements in machines for making tile for sidewalks, &c.; and it consists in the construction and arrangement hereinafter particularly described and claimed.

Figure 1:
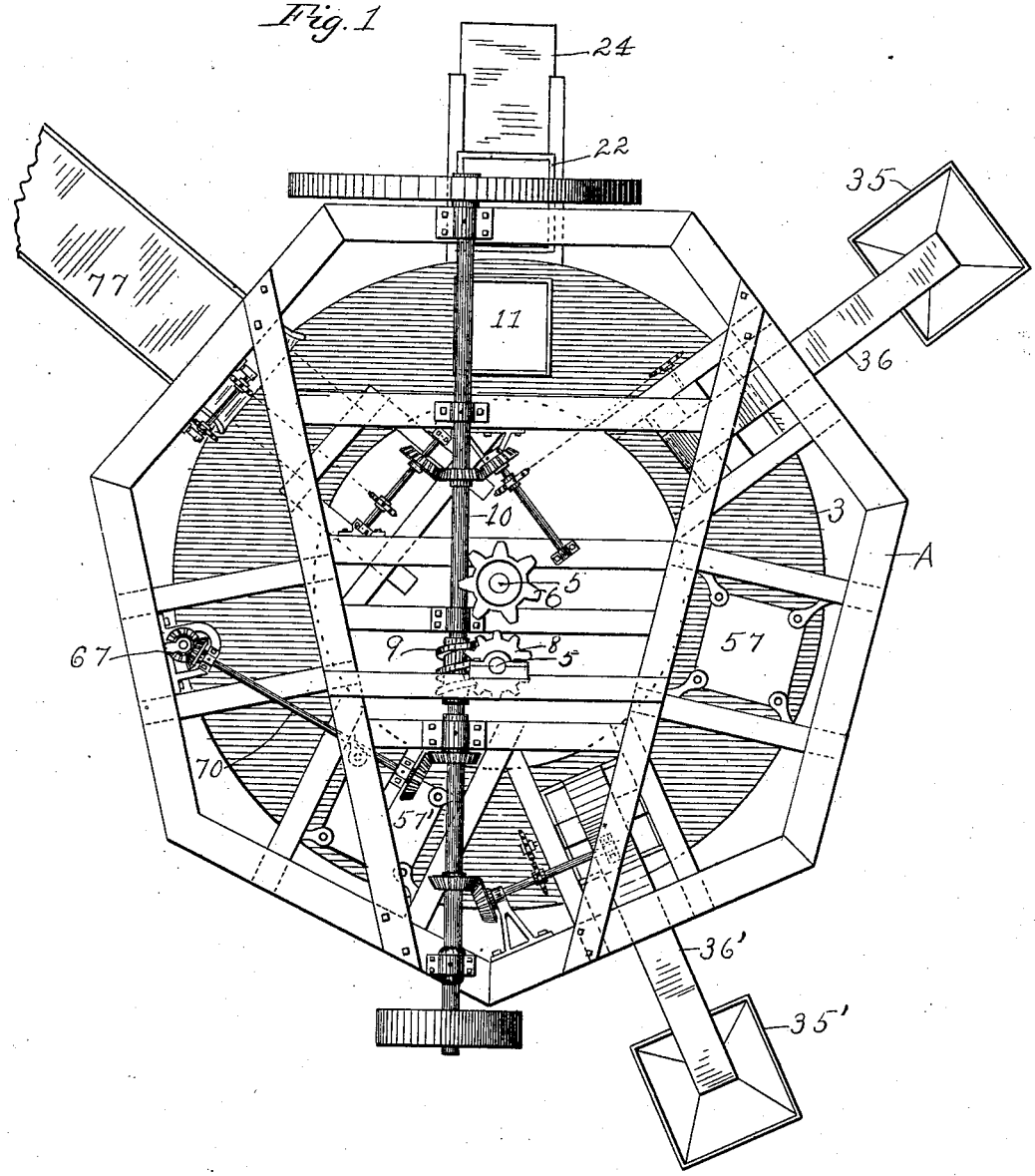
Figure 2:
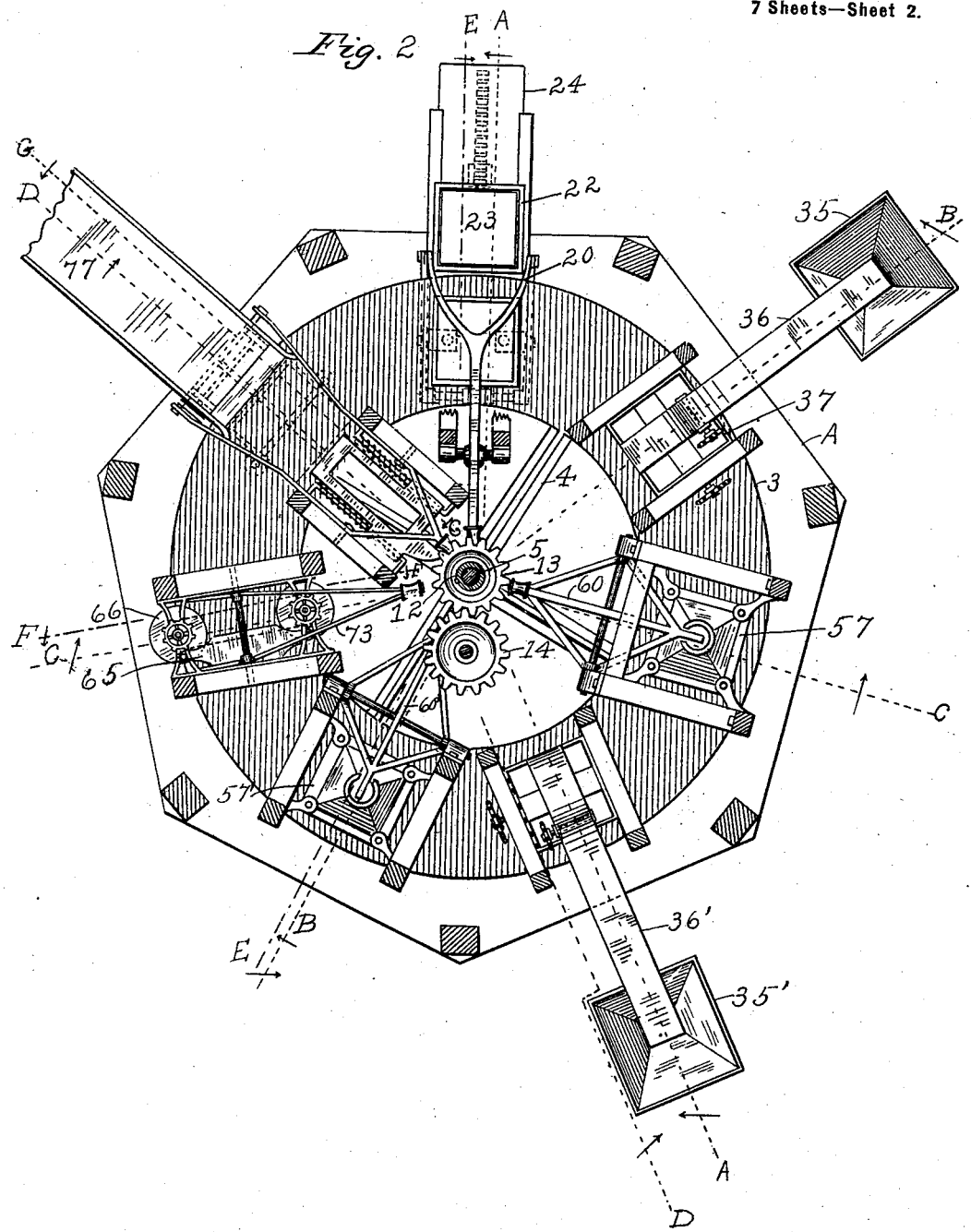
Figure 4:
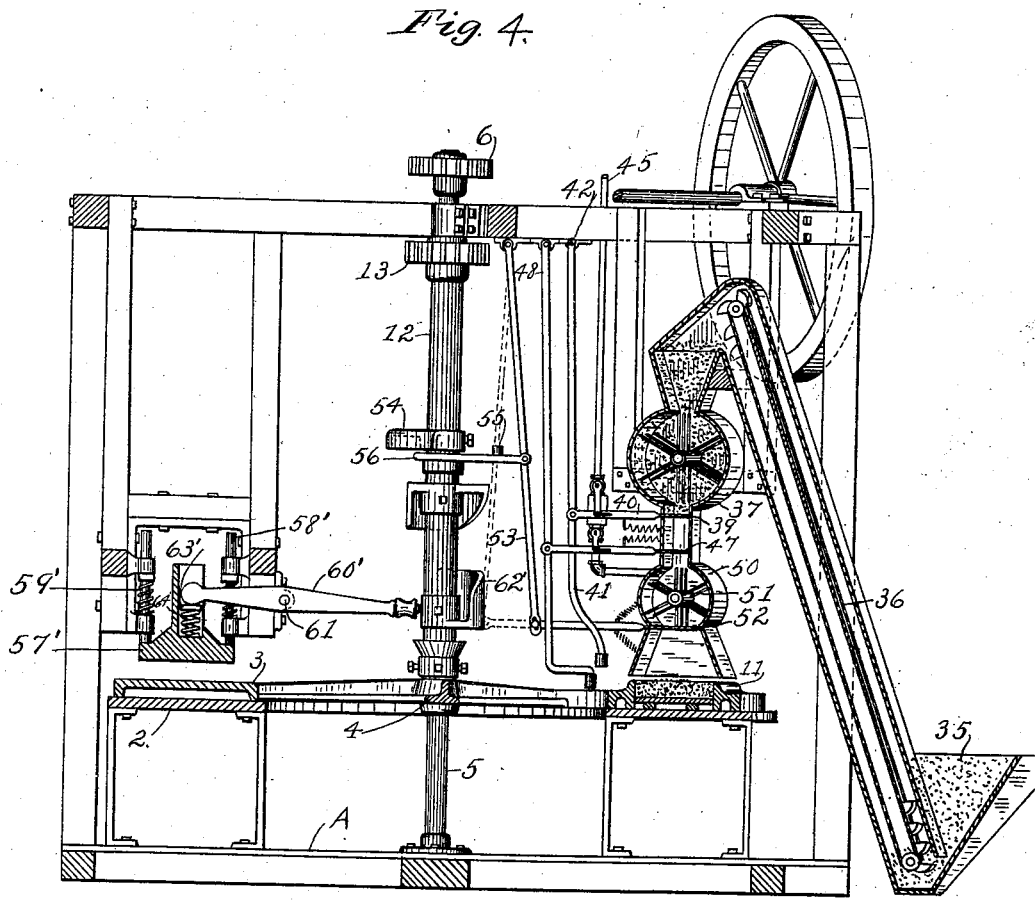
Figure 12:
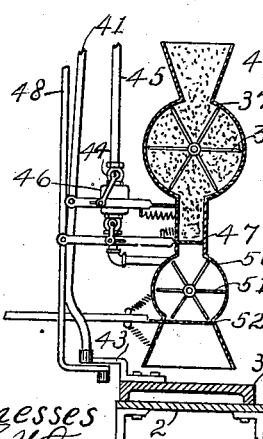
Figure 13:
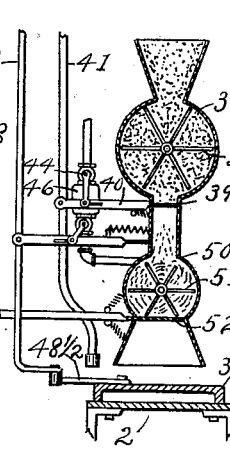
Figure 14:
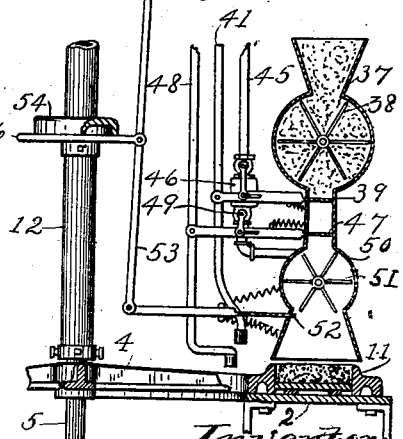
Figure 6:
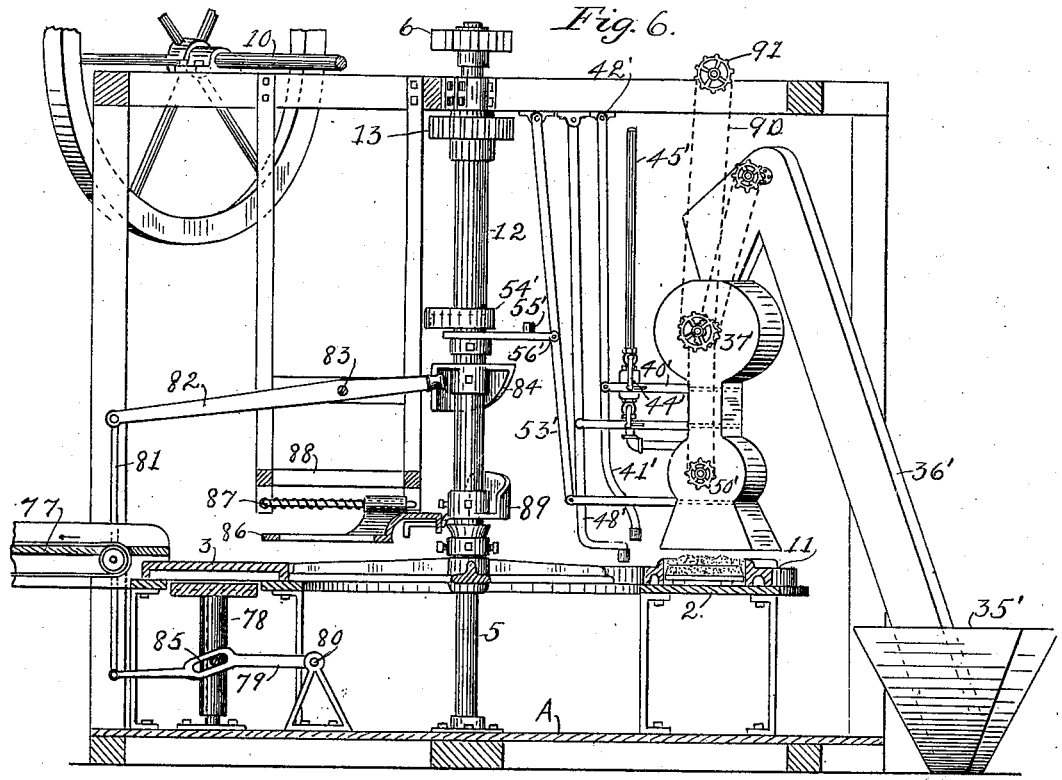
Figure 9:
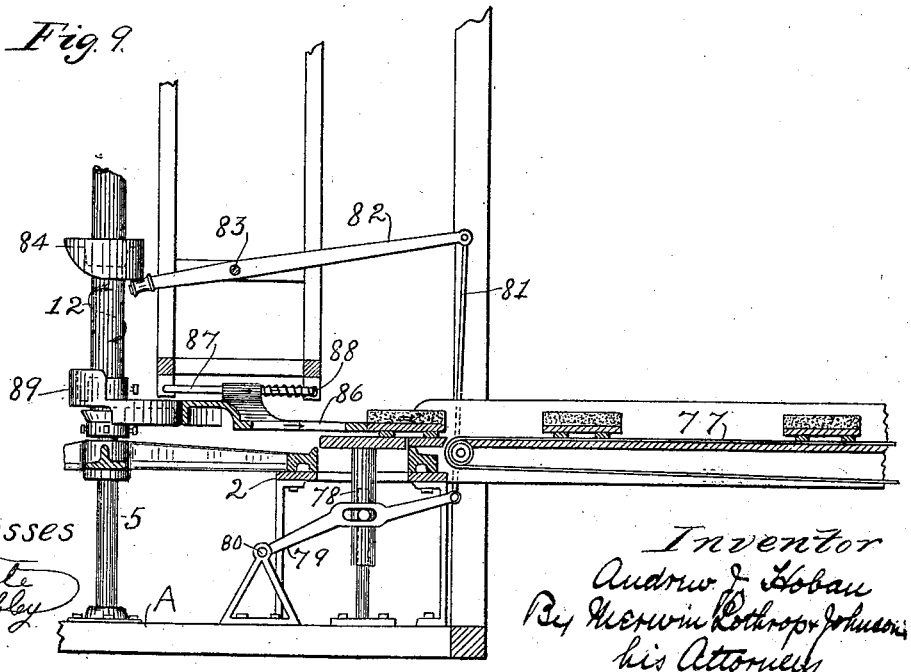

In the accompanying drawings, forming part of this specification, Figure 1 is a top elevation of my improved machine. Fig. 2 is a similar view with the upper framework removed. Fig. 3 is a section on line A A of Fig. 2. Fig. 4 is a section on line B B of Fig. 2. Fig. 5 is a section on line C C of Fig. 2. Fig. 6 is a section on line D D of Fig. 2. Fig. 7 is a section on line E E of Fig. 2. Fig. 8 is a section on line F F of Fig. 2. Fig. 9 is a section on line G G of Fig. 2. Figs. 10 and 11 are partial views of the carrying platform or table. Figs. 12, 13, and 14 are vertical sections through the feeding and mixing apparatus. Fig. 15 is a section on line 7 7 of Fig. 7. Fig. 16 is an end view of bottom-feeding mechanism, and Fig. 17 is a vertical section of the same.

In the drawings, A represents the framework, which is provided with a stationary elevated ring or table 2. Arranged upon the stationary table 2 is a rotatable ring or table 3, connected by spokes 4 with a vertical shaft 5. Upon the upper end of the vertical shaft 5 is mounted a seven-toothed gear 6, which is engaged and driven by a tooth 7, laterally offset from a gear 8, the gear 8 being engaged with and driven by worm-gear 9 upon the main driving-shaft 10. The operating-table 3 is formed with a mold-opening 11, in which a mixture is placed and acted upon to form a tile. The mechanism for carrying out the steps of the manufacture (which will be hereinafter specifically described) are actuated by cams mounted upon a hollow vertical shaft 12, driven from the main driving-shaft through the medium of the gears 13 and 14. It will be noted that the teeth upon said gears are in the ratio of sixteen teeth upon the gear 14 to fourteen upon gear 13. This causes the shaft 12 to be operated through one and one-seventh revolutions while the shaft 5 is being actuated by the cam 7 to turn the table through one-seventh revolution, thus keeping cam-shaft even with table.

There are shown in the drawings seven independent means for making the tile: first, the means for feeding the bottoms to the mold; second, for feeding a mixture into the mold; third, for compressing the mixture; fourth, for feeding a second mixture; fifth, for compressing the same into and upon the first mixture; sixth, for troweling and scraping, and, seventh, means for removing the finished tile and bottom.

Figs. 3, 15, 16, and 17 show the board-feeding means. In the position shown in Fig. 3 the mold-opening through the operating-table is registering with a similar opening 15 in the stationary platform 2. Underneath said opening is a slidable support 16. This support is raised and lowered to carry bottoms into the mold by means of a lever-arm 17, fulcrumed upon the horizontal shaft 18 and connected at its power end by rod 19 to the end of the lever 20, the opposite end of the lever being actuated by a cam 21, carried by the cam-shaft 12. Arranged outside of the operating-table is a receptacle 22, adapted to hold a series of tile-bottoms 23. The bottom of the receptacle is closed by a slide 24, provided with a toothed rack 25, with which engages a toothed segment 26, having pivotal support 27. The segment 26 is turned to carry the slide 24 to the rear of the receptacle by means of a rod 28, connecting the segment with an arm 29, having upon its end a clutch 30, slidable upon the shaft 18. The clutch member 30 is adapted to be thrown into contact with a clutch member carried by the arm 17 by means of a projection 31 upon the operating-table. (See Fig. 15.) The position of the projection 31 is such that it will engage the arm 29 to throw the clutch members into engagement simultaneously with the lifting of the bottom, which is upon the support 16, as shown in Fig. 3. The clutches are thrown into engagement as the support is lifted, this movement turning the arm 29 and turning the segment and slide to the rear of the receptacle, as shown in Fig. 3. As the table continues to revolve the cam upon the camshaft turns out of engagement with the lever 20, the lever-arms turning back into position shown in Fig. 17, bringing the receptacle-closing slide into contact with a bottom which has been dropped and pushing it against the support, as shown in Fig. 17. The connection between the segment and rod 28 consists of a pin 32 upon the segment, which fits in a slot 33 in the rod and is controlled by a spring 34. This connection is provided for the reason that the bottom will be carried into contact with the side of the support before the support has reached its lowered position. This stops further movement of the segment, and the slot-and-pin connection allows the rod to return to its normal position, the spring 34 turning the segment and slide into closed position as soon as the support reaches full lowered position, carrying the tile-bottom onto the top of the support.

The mechanism of the second step—i. e., the feeding of the first mixture—is illustrated best in Fig. 4. After a tile-bottom has been carried into the mold, as shown in Fig. 3, the operating-table is moved one-seventh of a revolution by its actuating-cam 7. The mixture is carried from a receptacle 35 by an endless carrier 36 to a hopper 37. The bottom of the hopper 37 is normally held closed by a slide-valve 39, connected by an arm 40 with the lever 41, said lever having pivotal support 42 upon the framework, with its lower end standing in position to be actuated by a projection 43 upon the operating-table. The lever-arm 41 is also connected with the valve 44, arranged in a water-pipe 45, so that as the lever-arm is actuated to withdraw the slide 39 it also opens the valve 44 and allows the filling of a chamber 46. Below the hopper-closing slide 39 is a space closed at its bottom by a slide 47. The slide 47 is operated in the same manner as the slide 39 by a hinged lever-arm 48, the lower end of which is adapted to be engaged by a projection 48½, as shown in Fig. 13. The lever 48 is connected with a valve 49 in the water-pipe below the chamber 46, whereby as the lever is actuated to withdraw the slide 47 it simultaneously opens the valve 49 and allows the water in the chamber 46 to pass to a second mixing-hopper 50. A mixer 51 is arranged in the mixing-hopper 50. The mixers 38 and 51 and the endless carriers are operated from the main driving-shaft through the medium of sprocket-chains 90, sprockets 91, and gears. The operations just described have been completed before the operating-table has been turned to bring its mold underneath the funnel of the mixing-hoppers. As the table is operated to bring its mold underneath the funnel of said hoppers the slide 52, which closes the bottom of the second mixer, is drawn into open position by the lever-arm 53 to allow the mixture to pass to the mold, as shown in Fig. 14. The lever 53, which has hinged support in the framework, is actuated by a cam 54 upon the cam-shaft. Said cam engages with a spur 55, carried by an arm 56, connected with the lever, thus actuating the lever at the proper point to open the second mixing-hopper, permitting the contents to drop into the mold, the hopper-valve being then closed by suitable springs. At this point the operating-table is turned one-seventh of a revolution, bringing the mold underneath the pressure-head. (Shown in Fig. 5.) The pressure-head 57 is secured upon the rods 58, slidably arranged in framework, as shown in Fig. 5, and held in raised position by springs 59. The pressure-head is adapted to be forced into contact with the mixture by a lever-arm 60, having fulcrum-support 61. The outer end of the lever-arm is engaged by a cam 62, carried by the cam-shaft, and the inner end bears against a plate 63, connected with the pressure-head by a coil-spring 64, said spring regulating the pressure upon the mixture. The head is preferably formed with a downwardly-projecting flange upon its outer edge. The above-described step having been completed, the operating-table is turned through another one-seventh of a revolution, which brings the parts into the position shown in Fig. 6. In this position the mold stands underneath a series of hoppers, which convey to the mold a second mixture, which forms the coating of the tile. The hoppers with the actuating means correspond in construction with the hoppers and actuating means which supply the first mixture, and therefore need not be so specifically described. The same numerals are applied to these features as are applied to the corresponding features of the first mixing and feeding means, the character "'" being added to the figures to distinguish them from the numerals of the first combination. The second mixture having been supplied to the mold, the operating-table is turned by its operating means underneath a second pressure-head, as shown in Fig. 7. The second pressure-head and its operating means correspond with the first, except that the face of the pressure-head is not flanged. As the pressure-head is withdrawn from the mold the operating-table is turned by its operating means through another one-seventh of a revolution, which turns it into the position shown in Fig. 8, bringing the mold underneath the troweling and scraping mechanism. This consists of a scraper or troweler 65, eccentrically secured to disks 66, mounted upon shafts 67. The shafts have sprocket connection 68, and one of them is connected with the main driving-shaft through gears 69 and shaft 70, so as to be continuously operated. The troweler and its operating-shafts are mounted in a frame 71, slidable upon the framework, as shown in Fig. 8, and normally held in raised position by a spring 72. The frame 70 is adapted to be lowered to bring the troweler into contact with the top of the mold by a lever 73, having pivotal support 74 in the framework and connected at 75 with the trowel-frame, the outer end of the lever being engaged by a cam 76, carried by the cam-shaft. This cam engages with the lever when the mold is underneath the trowel, as shown in Fig. 8. As this step is completed the continued operation of the operating-table brings the mold adjacent to an endless carrier 77. As the mold reaches this point a plunger 78, which is supported underneath the table and which stands flush with an opening in the fixed table 2, is forced upward, raising the bottom and tile to a level with the carrier, as shown in Fig. 9. The plunger is raised by a lever 79, which has pivotal support 80 and is connected at its opposite end by a rod 81 with a lever 82, the lever 82 having pivotal support 83. The inner end of the lever 82 is engaged by a cam 84 on the cam-shaft, turning the lever upon its pivot and raising the plunger 78 through the medium of the lever 79, the lever 79 having a slot-and-pin connection 85 with the plunger. As the plunger is raised to the position shown in Fig. 9 the false bottom for the tile is engaged by a traveler 86, which traveler is slidably supported upon a rod 87 and held in rear position by a spring 88. The traveler is actuated by a cam 89 upon the cam-shaft to force the tile onto the endless carrier. The continued operation releases the lever 83, allowing the plunger to drop to the lowered position shown in Fig. 6.

The continued operation of the operating-table brings it into position to receive another bottom, when the operations above described are repeated to continue the manufacture of tiles.

I claim—

1. In a tile-making machine, the combination with a traveling mold, of appliances for mixing and delivering a supply of tile-forming material, common actuating means for said mold and appliances, and automatically-actuated devices for supplying a quantity of water to said material before the same is delivered to the mold.

2. In a tile-making machine, the combination with a traveling mold, of appliances for mixing and delivering to said mold a supply of tile-making material, common actuating means for said mold and appliances, and means automatically actuated by the travel of said mold for delivering to said mixture a supply of water.

3. In a machine for making tile, the combination with a traveling mold, of devices for delivering false bottoms to said mold, means for mixing and delivering tile-forming material, automatically-actuated means for delivering a supply of water to said mixture, devices for compressing the material in the mold, troweling mechanism, a carrier adapted to receive the completed tile from its mold, and common actuating means for said mold, mixing apparatus, troweling mechanism and carrier.

4. In a machine for making tile, the combination with the traveling table, of a mold carried by said table, means actuated in the rotation of said table to deliver tile-forming material to said mold and to mix the same with water before such delivery, means for compressing the material in said mold, means for mixing and delivering a second supply of material to said mold, means for compressing the same, and means for receiving and delivering the tile so formed.

5. In a machine for making tile, the combination of a traveling table provided with molds, means for delivering false bottoms to said molds, means for supplying tile-forming material thereto, and a device actuated by the table in its travel to deliver a supply of water to said mixture.

6. In a machine of the class described, feeding means consisting of two chambers, valves normally separating the same, and actuating mechanism for said valves, a suitably-actuated valve controlling the outlet of the second chamber, means for measuring a predetermined quantity of water, and means for delivering said quantity of water to said second chamber.

7. In a machine of the class described, feeding means consisting of two chambers, mixing appliances in each, valves normally separating said chambers, means for actuating said valves, and means actuated by said valves for supplying a predetermined quantity of water to one of said chambers.

8. In a machine of the class described, feeding means consisting of two chambers, mixing appliances in each, a conduit connecting said chambers, a pair of valves arranged in said conduit, means for actuating said valves, and means actuated by one of said valves for supplying a predetermined quantity of water to one of said chambers.

9. In a machine of the class described, feeding means consisting of two chambers, mixing appliances in each, valves normally separating said chambers, actuating mechanism for said valves, valves normally closing the outlet-chamber, and actuating means for said valves.

10. In a machine of the class described, feeding means consisting of two chambers, mixing appliances in each, valves normally separating said chambers, closing-valves for the outlet-chamber, and means for independently actuating said valves at predetermined periods.

11. In a machine of the class described, feeding means consisting of two chambers, mixing appliances arranged in each, a conduit connecting said chambers, two slide-valves arranged in said conduit, and separated to form an intermediate chamber, and means for actuating said valves.

12. In a machine of the class described, feeding means consisting of two chambers, mixing appliances in each, a conduit connecting said chambers, a pair of slide-valves arranged in each conduit and at some distance apart to constitute an intermediate chamber, and actuating means for said valves.

13. In a machine of the class described, feeding means consisting of two chambers, mixing appliances arranged in each, a conduit connecting said chambers, slide-valves arranged in said conduit, at some distance apart to constitute an intermediate chamber, and means for independently actuating said valves at predetermined periods.

14. In a machine of the class described, feeding means consisting of two chambers, mixing appliances arranged in each, a conduit connecting said chambers, slide-valves arranged in said conduit, means for independently actuating said slide-valves, a slide-valve normally closing the outlet end of said chamber, and means for actuating said valve.

15. In a machine of the class described, feeding means consisting of two chambers, mixing appliances arranged in each, a conduit connecting said chambers, valves arranged in said conduit, actuating means for said valves, and means for furnishing a predetermined quantity of water to the second chamber.

In testimony whereof I affix my signature in the presence of two witnesses.

ANDREW J. HOBAN.

Witnesses:
H. S. JOHNSON,
ARTHUR P. LOTHROP.